(12) United States Patent
Richardson et al.

(10) Patent No.: US 12,577,763 B1
(45) Date of Patent: Mar. 17, 2026

(54) SMART HYDROSTATIONS

(71) Applicant: The Global H20 Initiative, PBC,
Miami, FL (US)

(72) Inventors: Jorge Richardson, Miami, FL (US);
Dave Tigue, Miami, FL (US); **Ryan
Barretta, Miami, FL (US); Owen Daw**,
Miami, FL (US)

(73) Assignee: The Global H20 Initiative, PBC,
Miami, FL (US)

( * ) Notice: Subject to any disclaimer, the term of this
patent is extended or adjusted under 35
U.S.C. 154(b) by 0 days.

(21) Appl. No.: 18/805,035

(22) Filed: Aug. 14, 2024

Related U.S. Application Data

(60) Provisional application No. 63/532,531, filed on Aug.
14, 2023.

(51) Int. Cl.
*E03B 9/20* (2006.01)
*B01F 23/23* (2022.01)
*G01S 17/08* (2006.01)

(52) U.S. Cl.
CPC ............ *E03B 9/20* (2013.01); *B01F 23/2366*
(2022.01); *G01S 17/08* (2013.01)

(58) Field of Classification Search
CPC ......... E03B 9/20; B01F 23/2366; G01S 17/08

USPC ...................................................... 222/189.06
See application file for complete search history.

(56) References Cited

U.S. PATENT DOCUMENTS

| | | | | |
|---|---|---|---|---|
| 8,511,105 B2 * | 8/2013 | Kamen | .................... | B01D 1/28 |
| | | | | 62/291 |
| 9,937,435 B2 * | 4/2018 | Kamen | .................... | B01D 1/02 |
| 2014/0197197 A1 * | 7/2014 | Kamen | .................... | C02F 1/325 |
| | | | | 222/52 |
| 2014/0379148 A1 * | 12/2014 | Sawyer | ................ | G06Q 20/145 |
| | | | | 705/14.69 |

* cited by examiner

*Primary Examiner* — Vishal Pancholi
(74) *Attorney, Agent, or Firm* — TROUTMAN PEPPER
LOCKE LLP; Ryan A. Schneider; Dustin B. Weeks

(57) ABSTRACT

Various examples are provided related to smart hydrostations or water fountains. In one example, a smart hydrostation includes a water system that can filter water for dispensing via an aeration nozzle located in a dispensing chamber; an electrical system that can monitor user access to the hydrostation and control dispensing of the filtered water; and one or more display panel that can display content transmitted to the hydrostation. A cloud-based system can provide the content for display. In another example, a system can include smart hydrostations at different locations in communication with a cloud-based system including a control center that can remotely control operations of the hydrostations and a monitoring system that can monitor operational conditions of each hydrostation.

10 Claims, 3 Drawing Sheets

SMART HYDROSTATIONS

CROSS REFERENCE TO RELATED APPLICATIONS

This application claims priority to, and the benefit of, U.S. provisional application entitled "Smart Hydrostations" having Ser. No. 63/532,531, filed Aug. 14, 2024, which is hereby incorporated by reference in its entirety.

BACKGROUND

Water is the world's most precious resource. Life would not exist without water. Despite its importance, water access is one of the last industries to go through a major technological transformation. The challenge is to provide sustainable hydration without waste.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
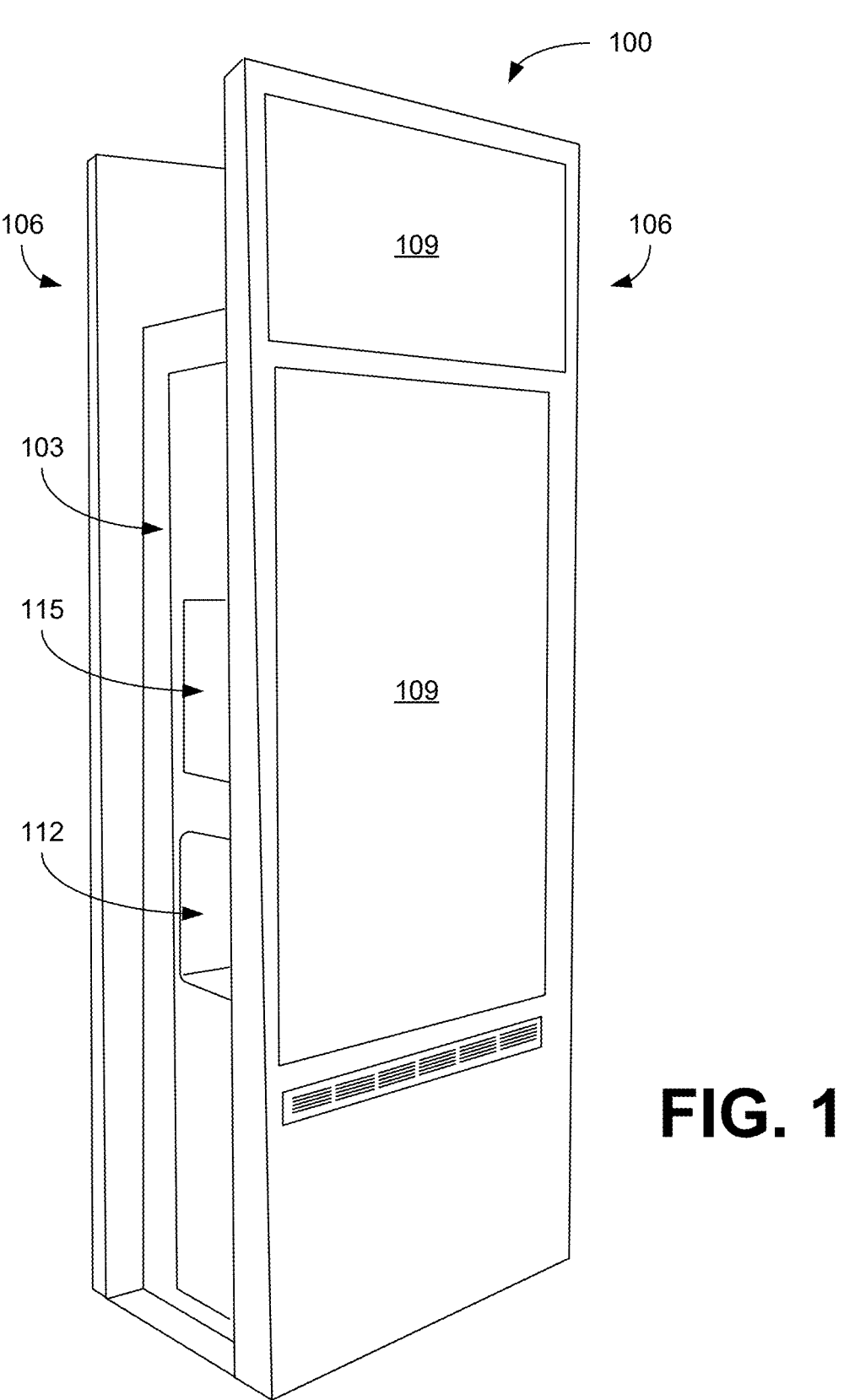
FIG. 1 is a graphical representation illustrating an example of a smart hydrostation, in accordance with various embodiments of the present disclosure.

Disclosed herein are various examples related to smart hydrostations or water fountains. Reference will now be made in detail to the description of the embodiments as illustrated in the drawings, wherein like reference numbers indicate like parts throughout the several views.

Referring to FIG. 1, shown is an example of a hydrostation or smart water fountain 100, in accordance with various embodiments of the present disclosure. The hydrostation 100 can include a dispensing housing 103 and one or more display panels 106 mounted or affixed to the dispensing housing 103. Sizing of the hydrostation 100 can vary depending on the location and application. For example, the hydrostation 100 can be about 8 feet tall (e.g., in a range from about 94 inches to about 98 inches), 2 feet wide (e.g., about 22 inches to about 28 inches), and about 3 feet deep (e.g., about 32 inches to about 40 inches). Other sizes are possible. The enclosures of the hydrostation 100 can be suitable for indoor or outdoor installations (e.g., IP65 rated).

In the example of FIG. 1, the dispensing housing 103 includes two display panels 106 mounted on opposite sides of the dispensing housing 103. Each display panel 106 can include one or more video screen 109 that can be used to display content such as, e.g., advertising, announcements, notifications, or other rendered materials. In some embodiments, the screens can be as large as 55 inches or more. The content displayed on the video screens 109 can be a static content or can be dynamic and vary over time.

As shown in FIG. 1, the hydrostation 100 can include a dispensing chamber 112 to provide potable water for, e.g., filling a water bottle or other container. For example, the water can be filtered, sanitized and/or chilled prior to being dispensed by the hydrostation 100. A user interface 115 can provide information about the water being dispensed and/or about operation of the hydrostation 100. The user interface 115 can be, e.g., a touch sensitive screen that allows a user to access information about the hydrostation 100 or to select the type of water being dispensed such as, e.g., chilled water, non-chilled water, or carbonated water. For instance, information can be provided about the water as it is being dispensed from the unit. The information can include, e.g., flow rate, temperature, quantity of water dispensed, and/or global impact information such as bottles or energy saved. The user interface 115 can also be used to access information about the operation of the hydrostation 100. For example, water supply conditions, filter conditions, power supply conditions, and/or other information can be accessed through the user interface 115.

Figure 2:
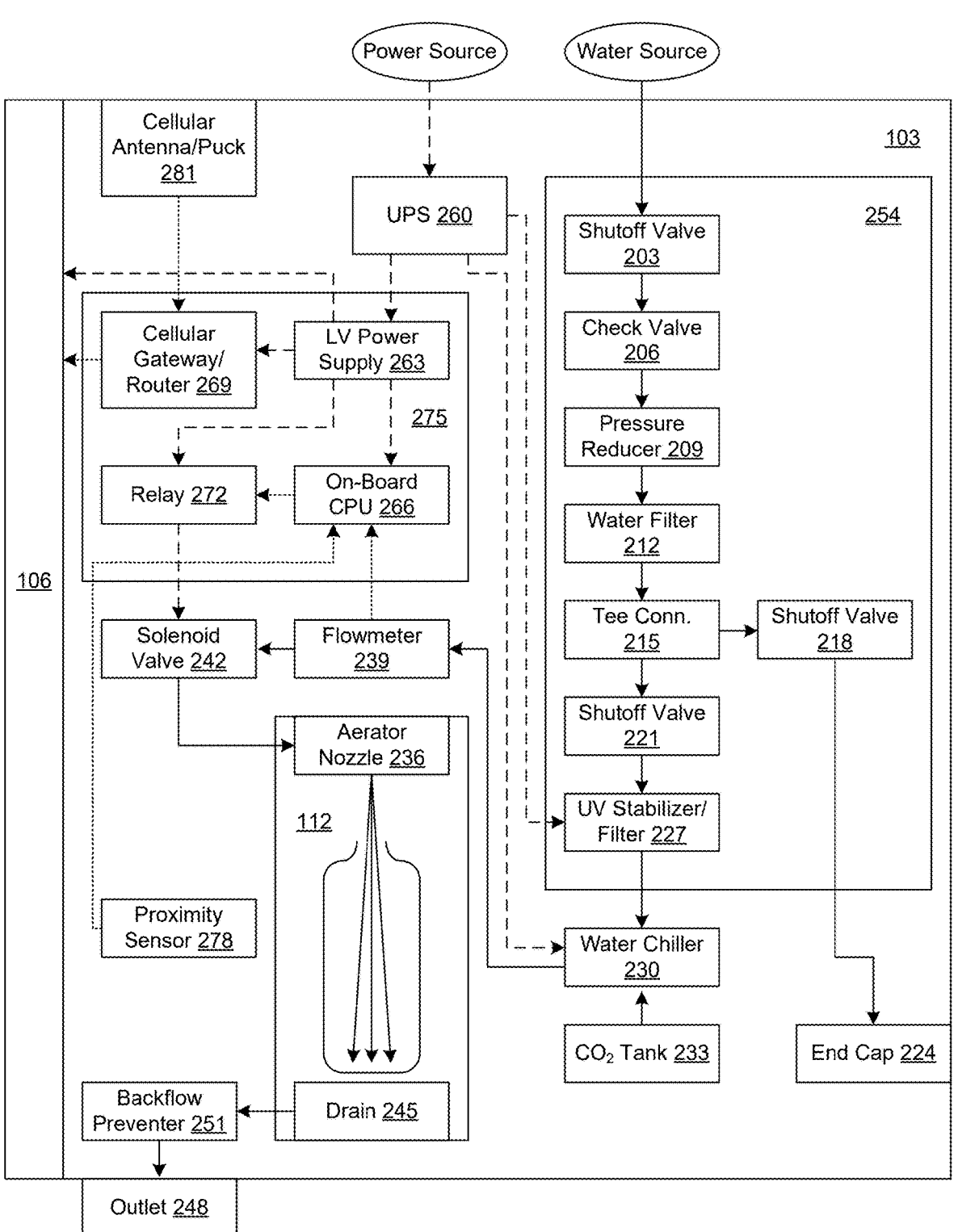
FIG. 2 is a schematic diagram illustrating an example of hydrostation components in a dispensing housing of the hydrostation of FIG. 1, in accordance with various embodiments of the present disclosure.

Referring next to FIG. 2, shown in a schematic diagram illustrating examples of hydrostation components of the hydrostation 100. FIG. 2 shows features associated with both a water source and a power source of the hydrostation 100. The water source can be a publicly available water supply adapted to couple to the hydrostation 100 through a shutoff valve 203 as illustrated in FIG. 2. The shutoff valve 203 allows the water system components of the hydrostation 100 to be isolated from the water source. Downstream of the shutoff valve, the water system can include a one-way check valve 206 to prevent backflow and a pressure reducer 209 to control water pressure supplied to the water filter 212 and other components of the water system. For example, the pressure reducer 209 can regulate downstream water pressure to about 50 psi or other appropriate operating pressure.

The water filter 212 can ensure the ability to provide high quality drinking water from the hydrostation 100. The water filter 212 can be configured to remove particles larger than a defined size. The water filter 212 can also be an activated carbon filter that can remove impurities that could leave a residual taste or odor in the dispensed water. A tee connection 215 and a combination of shutoff valves 218 and 221 can facilitate changing of the water filter 212 and purging of the lines. The water filter 212 can be isolated by closing shutoff valves 203 and 221 and drained by opening shutoff valve 218 and allowing the water to drain through a filter change purge line, e.g., after removing end cap 224. Once the water has been drained, the used water filter 212 can be removed and a replaced with a new water filter. With the new water filter 212 installed, shutoff valve 203 can be opened allowing the new water filter 212 to be flushed through shutoff valve 218 thereby removing any trapped air. Once the flushing is complete, shutoff valve 218 can be closed and shutoff valve 221 opened allowing operation of the hydrostation 100 to resume. The end cap 224 can again be replaced after the flushing is complete.

The hydrostation 100 can further include an ultraviolet (UV) stabilizer/filter 227 to further sanitize the water after filtering. After sanitizing the water, a water chiller 230 can cool and/or carbonate the water as it is being dispensed. The hydrostation 100 can incorporate a CO2 tank 233 in the dispensing housing 103 to provide a gas that can be added to the water for optional carbonation of the dispensed water. The chilled and/or carbonated water can be provided from the water chiller 230 to an aerator nozzle 236 at the top of the dispensing chamber 112 though, e.g., a flowmeter 239 and a solenoid valve 242. The solenoid valve 242 can be actuated in response to one or more sensor(s) or switch(s) to dispense a metered amount of water into a water bottle positioned in the dispensing chamber 112. A drain 245 at the bottom of the dispensing chamber 112 can collect any excess water and route it to an outlet 248 that directs the drainage to a sewer or other acceptable drainage (e.g., a gravel pit). A backflow preventer 251 can be included to eliminate the possibility of any backup from reaching the dispensing chamber 112. As illustrated in FIG. 2, a portion of the water system components can be enclosed in a filter panel 254, which can offer additional protection by limiting access to the filtering components.

In the example of FIG. 2, the power source supplies power to the electrical system of the hydrostation 100. The power source can be a publicly available power supply (e.g., 120V, 60 Hz or 230V, 60 Hz) which can be adapted to couple to an uninterruptible power supply (UPS) 260 of the hydrostation 100. As can be understood, the power source can be connected through breakers and other protection devices to provide protection as needed to satisfy local safety codes. The UPS 260 can provide ride through capabilities when the external power source fails. The UPS 260 can supply power to various components of the hydrostation components directly or through other intermediate components. As shown in FIG. 2, power for the UV stabilizer/filter 227 and water chiller 230 can be supplied directly by the UPS 260. By maintaining power to the UV stabilizer/filter 227, the filtering and treatment of the dispensed water is maintained even during a power outage.

The UPS 260 can also provide power through a low voltage (LV) power supply 263 which can provide power to a wide range of low voltage components. For example, the LV power supply 263 can supply power to the display panel(s) 106 of the hydrostation 100. The LV power supply 263 can also provide power to various control circuitry of the hydrostation 100 such as, e.g., an on-board computer processing unit (CPU) 266 (or other processor or computing/processing circuitry), a cellular gateway/router 269 (or other communication interface), a relay 272 which can provide power to the solenoid valve 242. Voltage flyback protector circuitry can be used to protect other components in the system from voltage spikes generated by the solenoid valve operation. As illustrated in FIG. 2, a portion of the electrical system components can be enclosed in an electrical panel 275 (e.g., a NEMA rated electrical enclosure), which can offer additional protection by enclosing the electrical and electronic components. In FIG. 2, the LV power supply 263, on-board CPU 266, cellular gateway/router 269, and relay 272 are shown in an electrical panel 275. The hydrostation 100 can also include one or more enclosure cooling fans and/or LED lights supplied by the LV power supply 263.

Operation of the hydrostation 100 can be controlled locally and automatically by instructions stored in memory and executed by the on-board CPU 266. For example, the hydrostation 100 can detect when a bottle is positioned within the dispensing chamber 112 to receive water. For example, a proximity sensor 278 can detect when a water bottle is positioned within the dispensing chamber 112. In some embodiments, the proximity sensor 278 can be an ultrasonic proximity sensor which can be configured to detect the approach of the user and the bottle towards the hydrostation 100. The proximity sensor 278 can send information to the on-board CPU 266 indicating the location and/or position of the bottle with respect to the aerator nozzle 236. The on-board CPU 266 can query the proximity sensor 278 on a regular basis to determine if a user is approaching the hydrostation 100 to obtain water. For example, a series of ultrasonic pulses can be transmitted to determine if an individual is moving to within a defined range of the hydrostation 100, and if a bottle is being extended toward the dispensing chamber 112. With the bottle in the appropriate position, the CPU 266 can initiate the relay 272 to actuate the solenoid valve 242 to begin dispensing the water. The flowmeter 239 can monitor the amount of water being dispensed to fill the bottle.

The hydrostation 100 can also include a cellular antenna/puck 281 communicatively coupled to the cellular gateway/router 269. The cellular antenna/puck 281 allows for a wireless connection communication with the hydrostation 100. For example, content can be downloaded to the cellular gateway/router 269 via the cellular antenna/puck 281 for display on the display panel(s) 106. This allows the display panel content to be remotely updated. The wireless connection also allows the on-board CPU 266 to be remotely accessed or updated.

Figure 3:
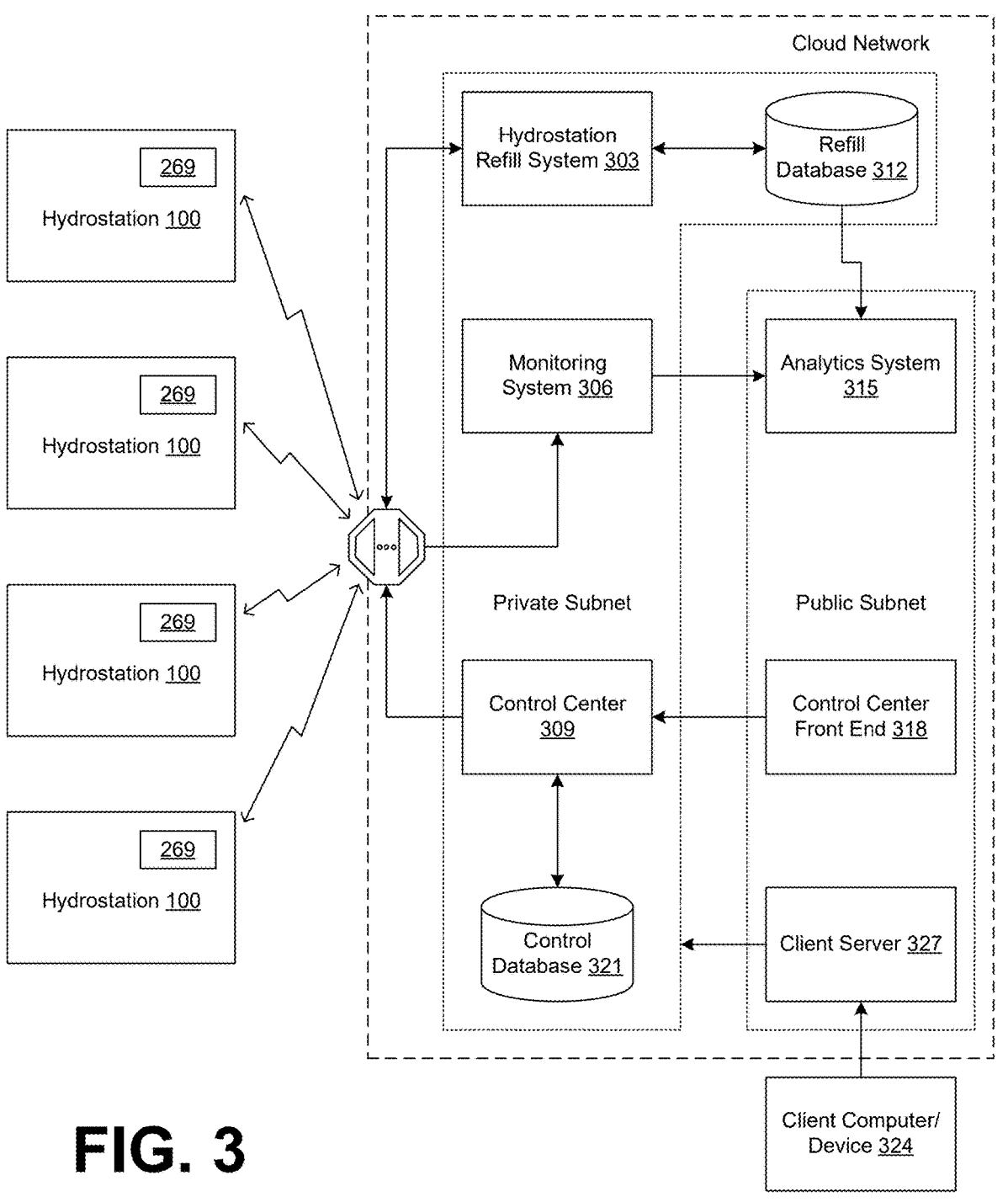
FIG. 3 is a schematic diagram illustrating an example of a distributed system of networked smart hydrostations, in accordance with various embodiments of the present disclosure.

Referring to FIG. 3, shown is an example of a distributed system of networked smart hydrostations 100. As shown in FIG. 3, smart hydrostations 100 can be distributed at various locations within a service area. A cloud-based system can be used to monitor the operational condition of the hydrostations 100. The hydrostations 100 can be communicatively coupled with the cloud-based system through a cellular network via the cellular/gateway routers 269 of the hydrostations 100. For example, the cloud-based system can include, e.g., a hydrostation refill system 303, a monitoring system 306, a control center 309, among other systems or applications. For example, the cloud-based system can be implemented in a virtual private cloud (VPC) comprising one or more servers or computing devices configured to execute programs or applications to facilitate the monitoring and operation of the smart hydrostations 100.

The hydrostation refill system 303 can monitor the condition of the water filter 212 (such as, e.g., carbon filters) and the UV stabilizer/filter 227 of each hydrostation 100 (FIG. 2). The hydrostation refill system 303 can be configured to receive information from the hydrostation 100 related to the filter operation for evaluation of the condition of the water filter 212 and/or the UV stabilizer/filter 227. Data can include, e.g., fluid flow through the filters, time of operation, time since last maintenance or replacement, etc. The collected data can be stored in a refill database 312 for later access. The filters can also include sensors configured to monitor the water quality existing and/or entering the filter to determine the effectiveness of the water filter 212 or the UV stabilizer/filter 227. The refill database 312 can also include monitoring limits or guidelines for filter operation. In some cases, the hydrostation refill system 303 or an analytics system 315 can be configured to initiate refill or replacement of the water filter 212 or UV stabilizer/filter 227 based upon the monitored conditions or operational times of the filters. Information about replacement components can be obtained from the refill database 312.

The monitoring system 306 can monitor a wide range of conditions and operations of the smart hydrostations 100 such as, but not limited to, the amount of water being dispensed by each hydrostation 100, the number of requests for water, the timing of the requests, etc. The monitoring system 306 can also track usage of the hydrostations 100 such as, e.g., number of water bottles saved, rate of refills, traffic or usage patterns, etc. The monitoring system 306 can also monitor internal system conditions of the hydrostations 100. For example, the monitoring system 306 can track the operation of the UPS 260 and LV power supply 263 (FIG. 2) to determine if a failure is occurring or if there is a problem with the power source. The monitoring system 306 can also be configured to initiate low power operation or shutdown of a hydrostation 100 to avoid damage or contamination of hydrostation components. In some implementations, the monitoring system 306 or the analytics system 315 can be configured to alert an operator or user of a degradation in system operation which could indicate the need for maintenance or further investigation.

The analytics system 315 can include a dashboard or interface that allows an operator or user to access information about the smart hydrostations 100. The analytics system 315 can provide information to the operator or user in standardized formats or can allow for customized formats or information requests. For example, the analytics system 315 can provide notifications of operational changes in the hydrostations 100 to the operator or user. The analytics system 315 can also allow the operator or user to access historical information stored in, e.g., the refill database 312 to evaluate trends or patterns that may indicate potential problems or the need for maintenance.

The control center 309 can be configured to provide remote control of the smart hydrostations 100. Operation of the hydrostations 100 can be remotely controlled by an operator or user through a control center front end 318, as illustrated in FIG. 3. For example, the control center front end 318 can be used to control the operational settings of various components of the hydrostation 100 such as, e.g., dispensing times and volumes, water pressure settings, water temperature, UV stabilizer settings, or other operational setpoints. These adjustments can be made based upon information provided by the analytics system 315. Operational settings of the hydrostations 100 can be stored in, e.g., a control database 321.

The control center 309 can also be used to control the content being displayed on the display panels 106 (FIG. 2) of the hydrostations 100. Content such as advertising or other display materials can be stored in, e.g., the control database 321. Content can be uploaded to one or more display panel through the cellular gateway/router 269 (FIG. 2) by the control center 309. The timing of the upload and display of the content can be controlled through the control center front end 318. The content being displayed may be provided to the control database 321 (e.g., by a third party) from a client computer or device 324 via a client server 327. In this way, content for display on the hydrostations 100 can be uploaded to the client server 327 and then imported to the control database 321 under the control of the operator or user via the control center front end 318. The operator or user can specify which display panel 106 on the It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A smart hydrostation comprising:
a water system configured to filter water for dispensing via an aeration nozzle that actively introduces air into a water stream located in a dispensing chamber, the water system comprising:
a water filter to filter the water prior to dispensing; and
an ultraviolet sterilizer to sterilize the water prior to dispensing;
an electrical system configured to:
monitor user access to the hydrostation by:
detecting a user's approach to the hydrostation; and
tracking user interactions with the hydrostation; and
control dispensing of the filtered water; and
one or more display panels configured to display content transmitted to the hydrostation;
wherein:
the hydrostation is communicatively coupled to a cloud-based system configured to provide the content for display on the one or more display panels; and
the content comprises advertisements that are remotely updated via the cloud-based system.

2. The smart hydrostation of claim 1, wherein:
the electrical system comprises an ultrasonic proximity sensor configured to:
detect a presence of the user proximate to the dispensing chamber;
detect the user's approach to the hydrostation; and
track the user interactions with the hydrostation; and
the electrical system is further configured to monitor user access patterns and user identification information.

3. The smart hydrostation of claim 2, wherein:
dispensing the filtered water is initiated based upon a detected position of a bottle in the dispensing chamber adjacent to the aeration nozzle;
the aeration nozzle comprises an air introduction mechanism configured to mix air with the water stream during dispensing; and
the ultrasonic proximity sensor is further configured to continuously monitor for:
the user's approach to the hydrostation; and
the position of the bottle.

4. The smart hydrostation of claim 3, wherein dispensing the filtered water is initiated by activating a solenoid valve via a relay.

5. The smart hydrostation of claim 1, wherein electrical power is supplied to the electrical system through an uninterruptible power supply.

6. The smart hydrostation of claim 1 further comprising:

a cellular gateway/router communicatively coupled to the cloud-based system via a cellular network;

wherein the cloud-based system comprises a control center configured to:

remotely control operations of the hydrostation; and transmit advertising content for display on the one or more display panels.

7. The smart hydrostation of claim 6, wherein the cellular gateway/router is configured to provide the content received from the cloud-based system to the one or more display panels.

8. The smart hydrostation of claim 6, wherein the content displayed on the one or more display panels is downloaded via the cellular network.

9. The smart hydrostation of claim 8, wherein the content is downloaded from a control database.

10. The smart hydrostation of claim 6, wherein the content comprises an advertisement.

* * * * *